US012761802B2

(12) United States Patent
Natarajan et al.

(10) Patent No.: US 12,761,802 B2
(45) Date of Patent: Oct. 13, 2026

(54) METHODS AND DEVICES FOR CACHE MANAGEMENT

(71) Applicant: SK Hynix NAND Product Solutions Corp., Rancho Cordova, CA (US)

(72) Inventors: Shankar Natarajan, Folsom, CA (US); Grzegorz Kowalczyk, Olsztyn (PL); Ramkarthik Ganesan, Folsom, CA (US); Michal Mamczynski, Gdynia (PL); Bartosz Kot, Gdansk (PL); Shivashekar Muralishankar, Folsom, CA (US); Sriram Natarajan, Austin, TX (US); Allyn Malventano, Florence, KY (US); Marcin Gutowski, Gdansk (PL)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 0 days.

(21) Appl. No.: 19/006,048

(22) Filed: Dec. 30, 2024

(65) Prior Publication Data

US 2026/0186661 A1 Jul. 2, 2026

(51) Int. Cl.
*G06F 3/00* (2006.01)
*G06F 3/06* (2006.01)

(52) U.S. Cl.
CPC .......... *G06F 3/0613* (2013.01); *G06F 3/0647* (2013.01); *G06F 3/0679* (2013.01)

(58) Field of Classification Search
CPC ..... G06F 3/0613; G06F 3/0647; G06F 3/0679
See application file for complete search history.

(56) References Cited

U.S. PATENT DOCUMENTS

| | | | | |
|---|---|---|---|---|
| 9,760,306 | B1 * | 9/2017 | Bigman | G06F 3/0605 |
| 10,462,012 | B1 * | 10/2019 | Rao | G06F 16/214 |
| 11,501,808 | B2 | 11/2022 | Kim et al. | |
| 2008/0154905 | A1 * | 6/2008 | Paalasmaa | G06F 16/9577 |
| 2011/0252218 | A1 * | 10/2011 | Davies | G06F 3/0649 711/E12.001 |
| 2014/0082295 | A1 * | 3/2014 | Beard | G06F 12/0815 711/135 |
| 2015/0082062 | A1 | 3/2015 | Saraswat et al. | |
| 2016/0224247 | A1 | 8/2016 | Woo et al. | |
| 2020/0301592 | A1 | 9/2020 | Frolikov | |
| 2021/0223992 | A1 * | 7/2021 | Hou | G11C 11/5628 |
| 2021/0373788 | A1 * | 12/2021 | Martin | G06F 3/0646 |
| 2023/0152991 | A1 | 5/2023 | Song et al. | |
| 2024/0106722 | A1 * | 3/2024 | Shen | H04L 41/16 |

* cited by examiner

*Primary Examiner* — Craig S Goldschmidt
(74) *Attorney, Agent, or Firm* — HG LAW LLP

(57) ABSTRACT

In accordance with some embodiments of the present disclosure, a method for operating a storage device coupled to a host device includes the storage device receiving priority information from the host device identifying high priority data stored on the storage device. The high priority data is identified by the host device based on a user interface identification of the high priority data stored on the storage device, or a plurality of requests to access the storage device generated by at least one application executing on the host device. The method further includes identifying an idle period in which no requests from the host device are received by the storage device, and transferring, during the idle period, at least a portion of the high priority data from the first memory to the second memory.

18 Claims, 7 Drawing Sheets

METHODS AND DEVICES FOR CACHE MANAGEMENT

TECHNICAL FIELD

The present disclosure is directed to methods and devices for data caching during idle periods using heuristically identified and/or user identified priority information.

SUMMARY

In accordance with the present disclosure, methods and storage devices (e.g., solid state devices (SSDs)) are provided for data caching during idle periods (e.g., period in which no requests from an application are received by the storage device) using messages (e.g., hints) provided by a driver of a host device using heuristically identified and/or user identified priority information.

In some embodiments, a storage device (e.g., an SSD) is communicatively coupled to a host device (e.g., computer). In some implementations, applications running on the host device (e.g., on Operating System (OS) of the host device) send I/O requests (e.g., read or write requests) to a storage device driver software of the host device. Such request may include requests to access storage data (e.g., to read or write files) of a connected storage device (e.g., SSD). The storage device driver may run on an operating system (OS) of the host device. In some embodiments, the storage device includes a slower access memory (e.g., main memory) and a faster access memory (e.g., cache memory). In some approaches, the faster access memory includes volatile memory such as DRAM, SRAM, any other suitable memory, or a combination thereof, or non-volatile memory (NVM) such as single-layer cells (SLCs). In some implementations, SLCs may provide a lower operational (e.g., read/write) latency and faster access to data compared to volatile memory. In some approaches, the slower access memory includes memory cells that can store multiple bit (e.g., quad-layer cells (QLCs), triple-layer cells (TLCs), multi-layer cells (MLCs), etc.). The driver may translate the request from applications and send resulting requests to the storage device. The storage device may then perform appropriate read and write operations and return requested data for read request and/or write data bases on the write requests.

In some embodiments, the storage device driver receives requests from applications running on the OS of the host device to access storage data stored on the storage device. In some embodiments, the storage device driver sends memory access request to firmware (FW) running on the control circuitry (e.g., controller) of the storage device based on the requests from the applications. The control circuitry of the storage device may identify and assign high priority to a portion of stored data based on the memory access requests. In some approaches, the identification of high priority data by the control circuitry in the storage device is based on file access frequency (e.g., based on repeat cache lists provided to the FW by the storage device driver of the host device). Data identified by the control circuitry in the storage device as higher priority may be moved from the slower access memory (e.g., main memory) to the faster access memory (e.g., cache memory) or from slower cache layer to a faster cache layer.

In some approaches, the storage device driver running on the host device provides additional priority information (e.g., hints) to the FW of the storage device. The control circuitry of the storage device may use the additional priority information to assign high priority to portions of stored data (e.g., to certain files) in addition or instead of using file access frequency data.

In some embodiments, the identified high priority files are transferred from the slower access memory (e.g., main memory) to the faster access memory (e.g., cache memory) while the application running on the host device is active (e.g., when the application is actively sending requests to the storage device). The transferred data is kept in the faster access memory of the storage device until, for example, it loses priority (e.g., due to decreased file access). The data with lower priority may then be transferred back into the slower access memory (e.g., main memory or slower cache layer) of the storage device.

However, with advancing application complexity (e.g., due to use of artificial intelligence (AI) models and large language models (LLMs), etc.), file sizes of the identified high priority data are becoming larger, and it is becoming more challenging to transfer these files while the application is active (e.g., sending requests to the storage device). In some scenarios, application activity (e.g., sending of storage access requests) is bursty (e.g., frequent changes from active to idle states) and the active periods may be too short for large file transfers.

Methods and devices to solve these problems are described herein. In some embodiments, the storage device driver running on the host device may perform heuristic analysis of memory storages requests received from at least one application to identity priority files (e.g., files used for an AI model) and provide messages to storage device FW (e.g., hints) identifying such files. For example, heuristic analysis of the memory storage requests may include looking for certain file sizes, looking for certain file names, looking for certain locations in folders. In some embodiments, instead or an addition to heuristics the driver may use an AI model (e.g., a discriminator model) that could be trained to identify AI files based on layers with wrights that have been determined by training the model bases on past request patterns that are known to be request for AI model files. For example, the AI model could use words like "weights," "models," "LLM" etc., combined with a large file size requirement (e.g., over 50 GB).

In some embodiments, users (e.g., users of applications) may identify (e.g., by pinning using user interface (UI) input of the host device) certain files as high priority. The pinning of certain files by the user may be used by the storage device driver to provide messages (e.g., hints) to the FW of the storage device.

The storage device may rely on such messages based on heuristics or user input from the driver to maintain a longer period of storage device activity (e.g., storage device is kept active for longer on receiving priority messages from the storage device driver) even after an application that sends access request for the files becomes idle. During such period and based on the hint messages from the driver, additional parts of the AI model file may be moved by the storage device from slower memory to faster memory. The lengths of the periods of time can vary based on the messages. For example, if the heuristics are high confidence, the storage device may maintain a long period of storage activity. If the heuristics are low confidence, the period may be longer. If the messages are based on human pinning, the period may be the longest.

Compared to other approaches, this approach decreases the load times of large files (e.g., artificial intelligence (AI) files, files that exceed a particular file size, etc.) by transferring (e.g., from main memory to cache memory) the large files during the additional periods where the storage device is active, even when the application that requested the file becomes idle (e.g., period in which no requests from the application are received by the storage device). This approach leads to faster access to the files later (e.g., later when an application becomes active again sends requests for the file) because a larger portion of the file was transferred to the faster memory.

In accordance with some embodiments of the present disclosure, a method is performed for operating a storage device coupled to a host device (e.g., computer), wherein the storage device includes a first memory (e.g., main memory) with first performance characteristics (e.g., read/write speeds) and a second memory (e.g., cache memory) with second performance characteristics. The method includes receiving, by the storage device from the host device, priority information identifying high priority data stored on the storage device. Both, the storage device and the host device include respective control circuitry to control the operation of the respective device, and respective processing circuitry to process data (e.g., perform computations, generate data, store data, transmit data, etc.) in the respective device. The high priority data is identified by the host device based on at least one of a user interface identification of the high priority data stored on the storage device, or a plurality of requests to access the storage device generated by at least one application executing on the host device. The method further includes identifying an idle period in which no requests from the host device are received by the storage device, and transferring, during the idle period, at least a portion of the high priority data from the first memory to the second memory.

In some embodiments, the high priority data is identified by the host device by identifying, by a storage device driver executing on the host device, one or more files stored on the storage device with a size that exceeds a particular file size.

In some embodiments, the high priority data is identified by the host device by identifying, by a storage device driver executing on the host device, an AI model file stored by the storage device by applying a heuristic model to the plurality of requests to access the storage device generated by the least one application executing on the host device.

In some embodiments, the first memory comprises a main memory that comprises a plurality quad-level cells (QLCs).

In some embodiments, the second memory comprises a cache memory that comprises a plurality of single-level cells (SLCs).

In some embodiments, the second memory comprises a cache memory that comprises a plurality of QLCs configured to operate as SLCs.

In some embodiments, the second performance characteristics comprises faster memory access operational speed than the first performance characteristics.

In some embodiments, where the high priority data was identified by the host device based on the plurality of requests to access the storage device generated by the at least one application executing on the host device, and the method further includes increasing, based on a message from a driver of the storage device executing on the host device, priority of the high priority data, determining that the high priority data has not been accessed over a period of time, and based, at least in part, on the determining that the high priority data has not been accessed over the period of time, decreasing priority of the high priority data.

In some embodiments, the method further includes based, at least in part, on the decreasing priority of the high priority data, transferring the high priority data from the second memory to the first memory.

In some embodiments, where the high priority data was identified by the host device based the user interface identification of the high priority data stored on the storage device, the method further includes periodically assigning increased priority to the high priority data based on a plurality of periodic messages from a driver of the storage device executing on the host device. The periodically assigning increased priority to the high priority data maintains increased priority of the high priority data when the high priority data has not been accessed over a period of time.

In accordance with some embodiments of the present disclosure, a storage device includes a first memory with first performance characteristics, a second memory with second performance characteristics, and control circuitry (e.g., controller). The control circuitry is configured to receive, from a host device, priority information identifying high priority data stored on the storage device, where the high priority data is identified by the host device based on at least one of a user interface identification of the high priority data stored on the storage device, or a plurality of requests to access the storage device generated by at least one application executing on the host device. The control circuitry is further configured to identify an idle period in which no requests from the host device are received by the storage device, and transfer, during the idle period, at least a portion of the high priority data from the first memory to the second memory.

In some embodiments, the high priority data is identified by the host device by identifying, by a storage device driver executing on the host device, one or more files stored on the storage device with a size that exceeds a particular file size.

In some embodiments, the high priority data is identified by the host device by identifying, by a storage device driver executing on the host device, an AI model file stored by the storage device, by applying a heuristic model to the plurality of requests to access the storage device generated by the least one application executing on the host device.

In some embodiments, the first memory comprises a main memory that comprises a plurality of QLCs.

In some embodiments, the second memory comprises a cache memory that comprises a plurality of SLCs.

In some embodiments, the second memory comprises a cache memory that comprises a plurality of QLCs configured to operate as SLCs.

In some embodiments, the second performance characteristics comprises faster memory access operational speed than the first performance characteristics.

In some embodiments, where the high priority data was identified by the host device based on the plurality of requests to access the storage device generated by the at least one application executing on the host device, the control circuitry is further configured to increase, based on a message from a driver of the storage device executing on the host device, priority of the high priority data, determine that the high priority data has not been accessed over a period of time, and based, at least in part, on the determining that the high priority data has not been accessed over the period of time, decreasing priority of the high priority data.

In some embodiments, the control circuitry is further configured to based, at least in part, on the decreasing priority of the high priority data, transfer the high priority data from the second memory to the first memory.

In some embodiments, where the high priority data was identified by the host device based the user interface identification of the high priority data stored on the storage device, the control circuitry is further configured to periodically assign increased priority to the high priority data based on a plurality of periodic messages from a driver of the storage device executing on the host device. The periodically assigning increased priority to the high priority data maintains increased priority of the high priority data when the high priority data has not been accessed over a period of time.

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in some embodiments" appearing herein describe various embodiments and implementations, and do not necessarily all refer to the same one or more embodiment. However, they are also not necessarily mutually exclusive. In the drawings.

DETAILED DESCRIPTION

Figure 1:
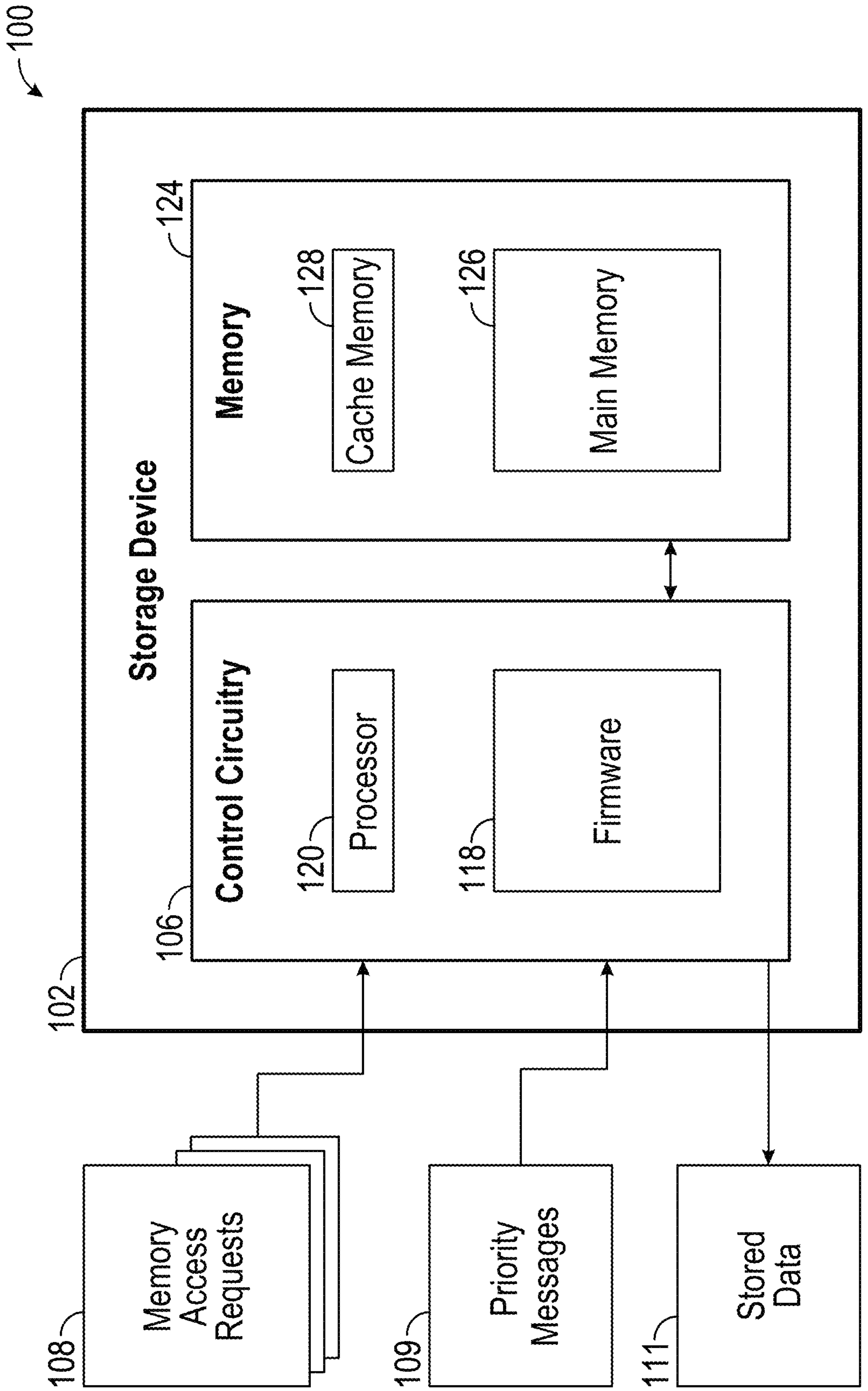
FIG. 1 shows an illustrative diagram of a storage device system, in accordance with some embodiments of the present disclosure.

FIG. 1 shows an illustrative diagram of a storage device system 100 including a storage device 102 (e.g., SSD), in accordance with some embodiments of the present disclosure. In some embodiments, the storage device 102 includes memory 124 (e.g., 3D NAND, 3D NOR, any other suitable memory, or a combination thereof) and control circuitry 106 (e.g., controller). In some embodiments, memory 124 includes cache memory 128 (e.g., SLC) and main memory 126 (e.g., multi-level cell (MLC), triple-level cell (TLC), QLC, etc.). In some embodiments, SLCs may store one bit of data, MLCs may store two bits of data, TLCs may store three bits of data, and QLCs may store four bits of data. In some embodiments, memory access becomes slower as the number of bits per cells increases due to more complex voltage level (e.g., threshold voltage) interpretations. In some embodiments, the faster memory (e.g., cache memory) may include several layers of cells (e.g., SLCs, MLCs, TLCs, etc.) where each layer may have a different level of speed (e.g., fast, faster, fastest, etc.). In some embodiments, a QLC may be used as an SLC, an MLC, or a TLC. In some embodiments, the control circuitry 106 (e.g., controller) includes a processor 120 and firmware 118 (e.g., the software that controls the storage device hardware).

In some embodiments, the control circuitry 106 receives memory access requests 108 (e.g., read/write requests) from a communicatively coupled device (e.g., a host device). In some examples, the storage device 102 in FIG. 1 is similar to storage device 202 in FIG. 2. In some examples, the communicatively couples device in FIG. 1 is similar to host device 203 in FIG. 2. In some embodiments, devices being communicatively coupled includes being connected (e.g., by SATA connecter or cable, USB cable, PCIe connecter or cable, Bluetooth, Wi-Fi, any other suitable memory, or any combination thereof) in a manner that information can be shared between the devices (e.g., storage device 202 and host device 203). In some embodiments, the control circuitry 106 additionally receives priority messages 109 from a communicatively coupled device (e.g., host device).

In some embodiments, the control circuitry 106 runs based on instructions stored as firmware 118 in a non-volatile memory of the storage device 102. In some embodiments, the priority messages 109 include priority information (e.g., hints based repeat cache lists, hints based on heuristic analysis, hints based on a user input) for the firmware 118 for identifying high priority files/data. In some embodiments, based on the priority information in the priority messages 109, the firmware 118 identifies, assigns, and transfers high priority data from the main memory 126 to the cache memory 128. In some embodiments, the transfer occurs during an application idle period when the storage device 102 is not receiving memory access requests 108 or priority messages 109 from the communicatively coupled device (e.g., host device). For example, if an application does not sent a request for 5 seconds, the storage device is kept active for 10 more seconds to transfer the files/data.

In some embodiments, control circuitry 106 retrieves requested stored data from the memory 128 and sends the stored data 111 to a communicatively coupled device (e.g., host device). The storage device 102 may send stored data 111 (e.g., stored data files) to the communicatively coupled device (e.g., host device) based on the files requested in the memory access requests 108.

Figure 2:
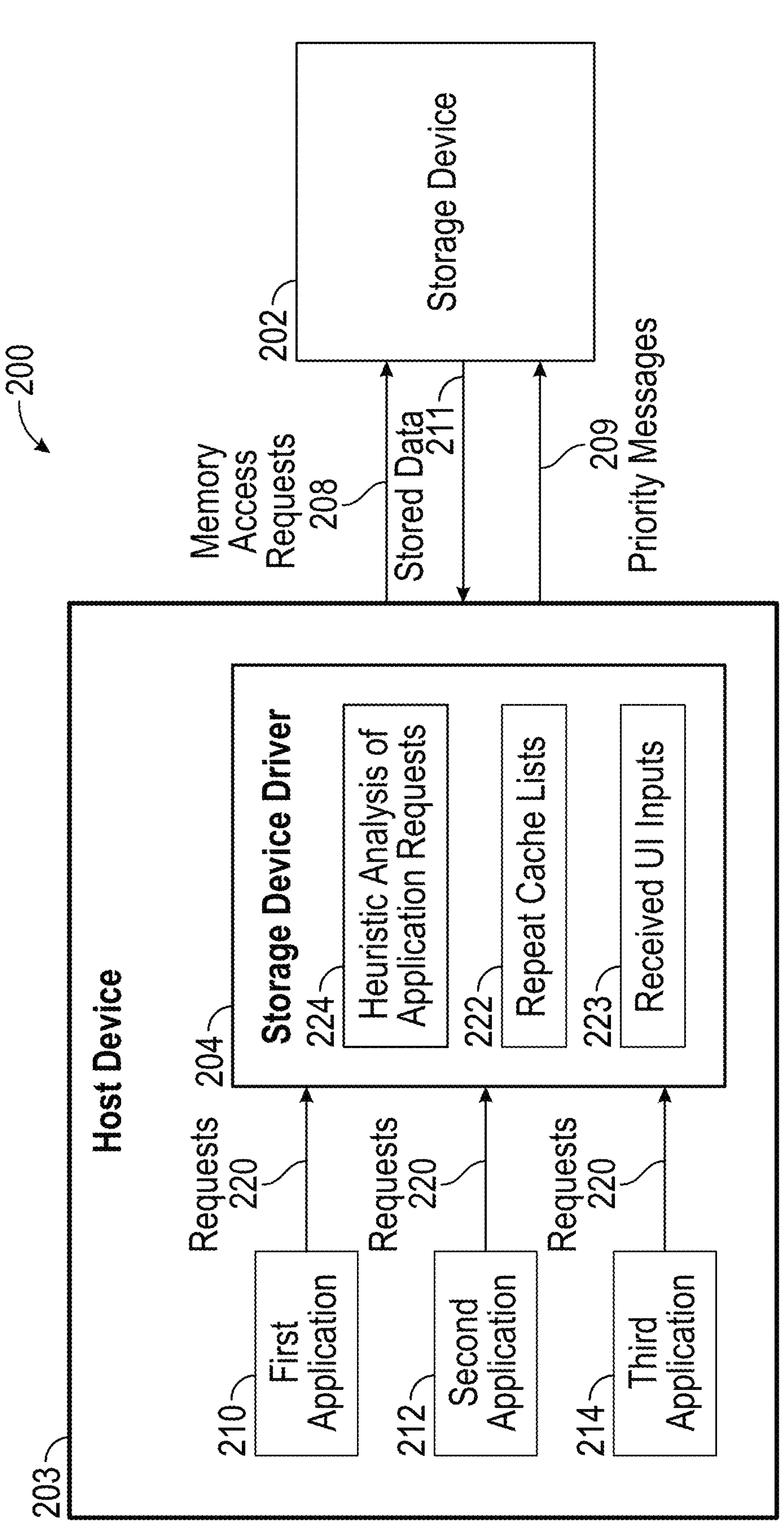
FIG. 2 shows an illustrative diagram of a host device system, in accordance with some embodiments of the present disclosure.

FIG. 2 shows an illustrative diagram of a host device system 200 including a host device 203 and a storage device 202, in accordance with some embodiments of the present disclosure. In some embodiments, the host device 203 is commutatively coupled to storage device 202. In some embodiments, the storage device 202 (e.g., SSD) may be located inside the host device 203 (e.g., computer). In some embodiments, the storage device 202 (e.g., SSD) may be located outside the host device 203 (e.g., computer). In some embodiments, the storage device 202 in FIG. 2 is storage device 102 in FIG. 1. In some embodiments, the storage device 202 in FIG. 2 is storage device 102 in FIG. 1. A host device 203 (e.g., computer) may include several components, such as a central processing unit (CPU), storage (e.g., memory), other peripherals. An OS is a software that manages software and hardware resources of the host device 203. In some embodiments, a storage device driver 204 may run on the OS on the host device 203. The storage device driver 204 may handle requests from one or more applications executing on the host device 203 (e.g., first application 210, second application 212, and third application 214) and requests 220 (e.g., read requests to the storage device 202) from the respective applications. While three applications (i.e., first application 210, second application 212, and third application 214) are shown in FIG. 2, any suitable number of applications may be included. In some embodiments, the storage device driver 204 runs on an OS of the host device 203.

In some embodiments, the storage device driver 204 sends memory access requests 208, where the memory access requests 208 may be based on the requests 220 received by the driver 204 from the applications (i.e., first application 210, second application 212, and third application 214). In some embodiments, the driver 204 additionally sends priority messages 209 (e.g., hints for identifying high priority data) to the storage device 202. In some embodiments, the storage device 202 sends stored data 211 to the driver 204 in the host device 203. The stored data 211 may be sent based on the files requested in the memory access requests 108. The memory access requests 208 in FIG. 2 may be the memory access requests 108 in FIG. 1, the priority messages 209 (e.g., hints based repeat cache lists, hints based on heuristic analysis, hints based on a user input) in FIG. 2 may be the priority messages 109 in FIG. 1, and the stored data 211 in FIG. 2 may be the stored data 111 in FIG. 1.

In some embodiments, the priority messages 209 are based on repeat cache lists 222. In some embodiments, the priority messages 209 are additionally based on heuristic analysis of application requests 224 (e.g., looking for certain file sizes, looking for certain file names, looking for certain locations in folders, using an AI model (e.g., a discriminator model) that could be trained to identify AI files based on past request patterns, etc.). In some embodiments, the priority messages 209 are based on received UIs 223. In some embodiments, the host device 203 includes UI circuitry (e.g., keyboard port, mouse port, etc.). In some embodiments, based on the priority information in the priority messages 209, firmware in storage device 202 identifies, assigns, and transfers high priority data from a slow access main memory (e.g., similar to main memory 126) to a fast access cache memory (e.g., similar to cache memory 128). In some embodiments, the transfer occurs during an idle period when the storage device 202 is not receiving memory access requests 208 or priority messages 209 from the host device 203.

Figure 3:
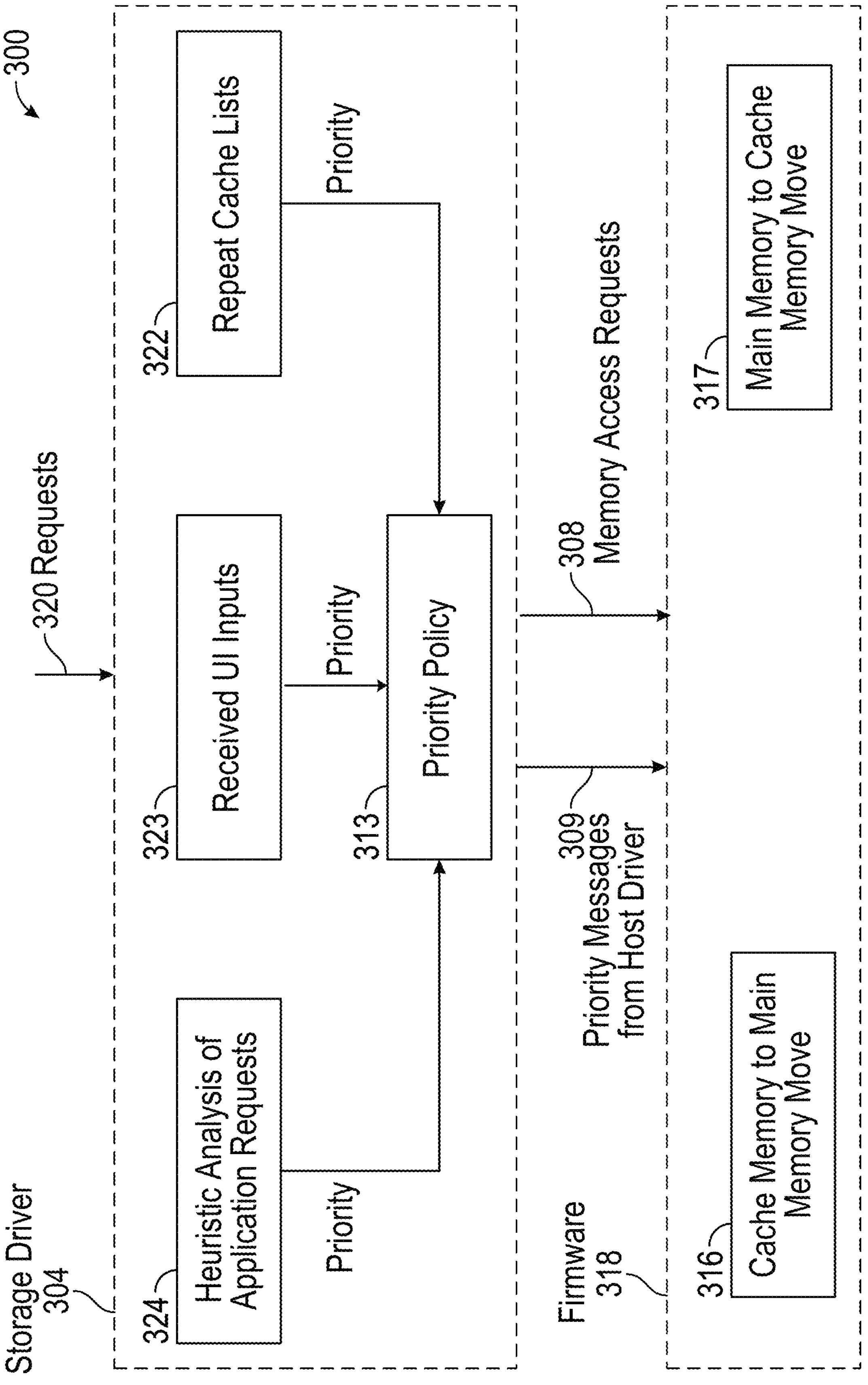
FIG. 3 shows an illustrative diagram of a storage device driver interacting with firmware of the storage device, in accordance with some embodiments of the present disclosure.

FIG. 3 shows an illustrative diagram of system 300 in which a storage device driver 304 is interacting with firmware 318, in accordance with some embodiments of the present disclosure. The storage device driver 304 (e.g., storage device driver 204) may run on an OS on a host device (e.g., host device 203) and the firmware 318 (e.g., firmware 118) may run on the control circuitry (e.g., control circuitry 106) of a storage device (e.g., storage device 102, storage device 202, etc.). In some embodiments, the storage device driver 304 receives requests 320 (e.g., requests 220 and/or requests similar to request 220) from applications. Based on the requests 320, the driver 304 send memory access requests 308 to the firmware 318. In some embodiments, the driver 304 additionally sends priority messages 309 (e.g., priority messages 209 and 109, and/or requests similar to priority messages 209 and 109) to the firmware 318. In some embodiments, the priority messages 309 is based on a priority policy 313 determined by the driver 304 based on repeat cache lists 322 (e.g., repeat cache lists 222, and/or requests similar to repeat cache lists 222), on the heuristic analysis of application requests 324 (e.g., looking for certain file sizes, looking for certain file names, looking for certain locations in folders, using an AI model (e.g., a discriminator model) that could be trained to identify AI files based on past request patterns, etc.), and on received UI inputs 323 (e.g., UI inputs 223, and/or requests similar to repeat UI inputs 223).

In some embodiments, based on the priority messages 309, the control circuitry in the storage device assigns and transfers 316 high priority data from the main memory (e.g., main memory 126) to the cache memory (e.g., cache memory 128) during an idle time (e.g., when the application requesting the data is not sending requests). In some embodiments, some of the data in the cache memory loses priority over time (e.g., due to no or low access by applications) and does not meet a minimum criteria for being high priority. On reaching the minimum criteria, the control circuitry in the storage device may transfer 317 such data from the cache memory back to the main memory. In some embodiments, the cache memory may have faster memory access than the main memory. In some embodiments, the cache memory may include several layers of cells (e.g., SLCs, MLCs, TLCs, etc.) where each layer may have a different level of speed (e.g., fast, faster, fastest, etc.).

Figure 4:
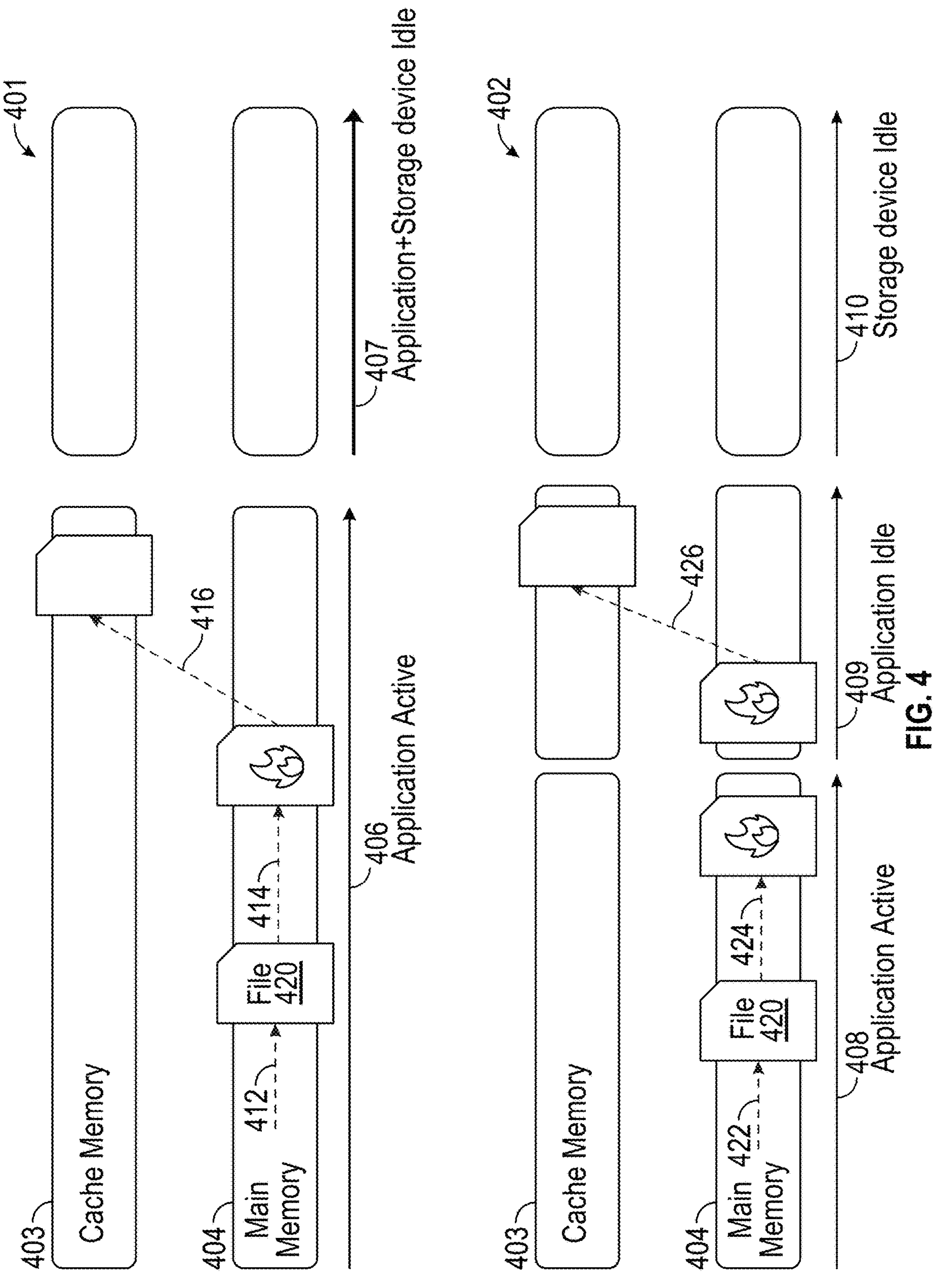
FIG. 4 shows illustrative schematic representations of examples of cache management techniques, in accordance with some embodiments of the present disclosure.

FIG. 4 shows illustrative schematic representations of examples of cache management techniques, in accordance with some embodiments of the present disclosure.

In some embodiments, example 401 shows a method of cache management in a storage device (e.g., storage device 102, storage device 202) which is communicatively coupled to a host device (e.g., host device 203). In example 401, the transfer (e.g., transfer 316) of a high priority file 420 is done from slower access memory (e.g., main memory 404, similar to main memory 126) to faster access memory (e.g., cache memory 403, similar to cache memory 128) when the requesting (e.g., using requests 220) the file is active (e.g., sending requests to the storage device 102 or 202). In some embodiments, the faster access memory (e.g., cache memory) may include several layers of cells (e.g., SLCs, MLCs, TLCs, etc.) where each layer may have a different level of speed (e.g., fast, faster, fastest, etc.).

At step 412, a file 420 is requested (e.g., using requests 220) to be accessed by an application (e.g., first application 210, second application 210, third application 210, etc.), where the request (e.g., memory access request 208) may further be sent from the storage device driver (e.g., similar to storage device driver 204) on an OS of a host device (e.g., host device 203) to a FW (e.g., firmware 118) on a storage device (e.g., storage device 202, storage device 102, etc.).

At step 414, the control circuitry in the storage device the priority on file 420 based on the access request for file 420 by the application.

At step 416, the control circuitry in the storage device transfers the high priority file 420 from main memory 404 (e.g., main memory 126) to cache memory 403 (e.g., cache memory 128). The cache memory may include several layers (e.g., fast, faster, fastest) of memory cells (e.g., TLC, MLC, SLC).

In some embodiments, step 412, step 414, and step 416 occurs when the application requesting the file 420 is active at period 406 (e.g., sending requests to the storage device 102, storage device 202). The storage device and the application requesting the file 420 may become idle at period 407 after the transfer of the file 420. For example, period 406 may be 3 seconds long, after which both the application requesting the file and the storage device 102 may become idle.

In some embodiments, example 402 shows a method of cache management in a storage device (e.g., storage device 102, storage device 202) which is communicatively coupled to a host device (e.g., host device 203). In example 402, the transfer (e.g., transfer 316) of a high priority file 420 is done from slower access memory (e.g., main memory 404, similar to main memory 126) to faster access memory (e.g., cache memory 403, similar to cache memory 128) when the requesting the file is idle (e.g., not sending requests to the storage device 102 or 202). In some embodiments, the transfer (e.g., transfer 316) of the high priority file 420 may be performed when the application requesting the file 420 is idle for a certain predefined length of time.

At step 412, a file 420 is requested to be accessed by an application, where the request (e.g., memory access request 208) may be sent from the storage device driver (e.g., similar to storage device driver 204) on an OS of a host device (e.g., host device 203) to a FW (e.g., firmware 118) on a storage device (e.g., storage device 202, storage device 102, etc.).

At step 422, a file 420 is requested to be accessed by an application (e.g., first application 210, second application 210, third application 210, etc.), where the request may be sent from the storage device driver on an OS of a host device to a FW on a storage device. In some embodiments, step 412 is similar step 422.

At step 424, the control circuitry in the storage device increases the priority on file 420 based on the access request for file 420 by the application. In some embodiments, step 414 is similar to step 424.

At step 426, the control circuitry in the storage device transfers the high priority file 420 from main memory 404 (e.g., main memory 126) to cache memory 403 (e.g., cache memory 128). step 426 may occur after the application become idle at period 409 (e.g., not sending requests to the storage device 202). The storage device may become idle at period 410 after the transfer of the file 420. As compared to the method in example 401, the method in example 402 may reduce load times for the file 420 and provide faster access to the files later (e.g., later when an application requests for the file).

Figure 5:
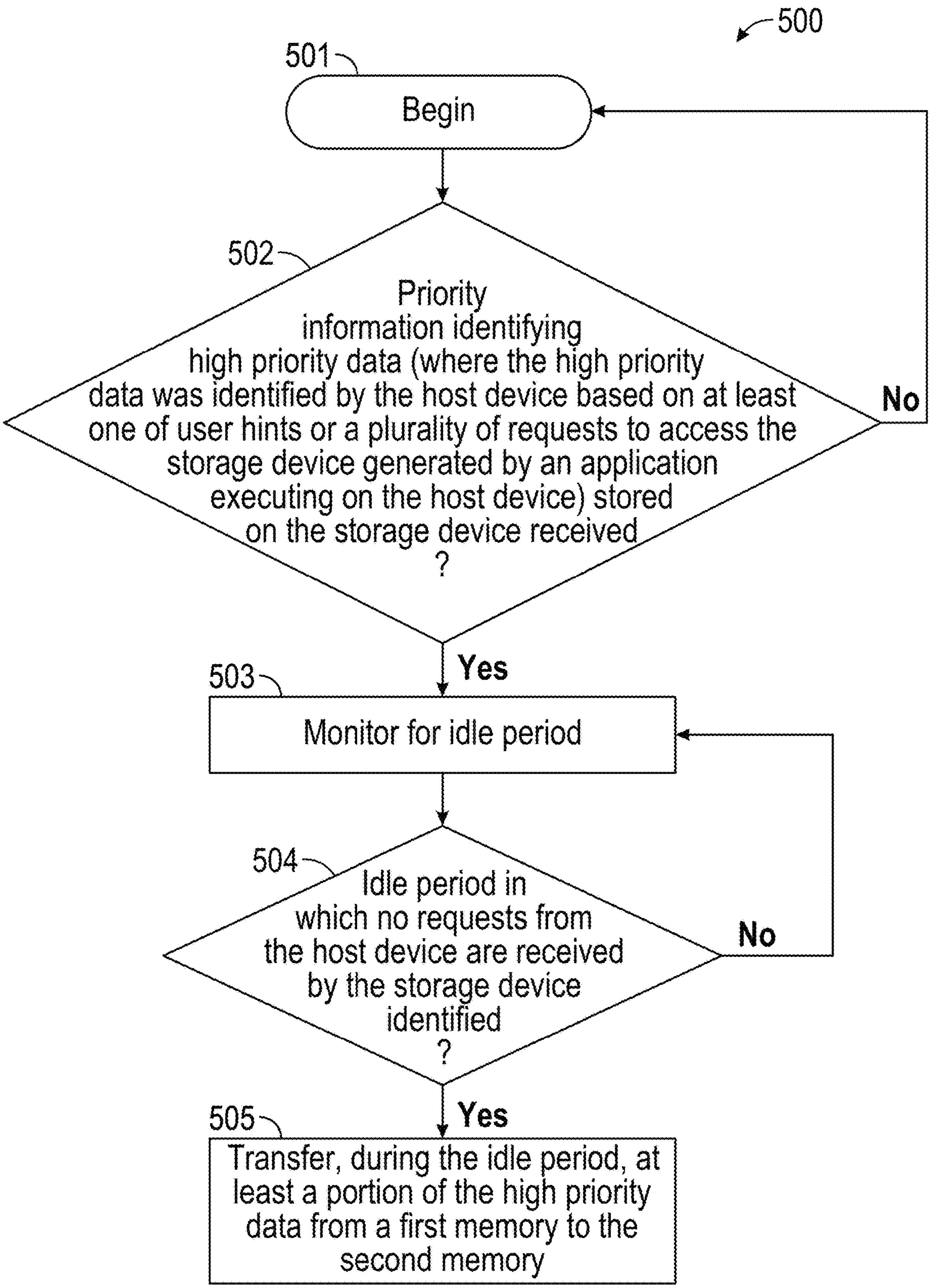
FIG. 5 shows an illustrative flowchart of a method for managing data caching based on priority information, in accordance with some embodiments of the present disclosure.

FIG. 5 shows an illustrative flowchart 500 of a method for managing data caching based on priority information (e.g., priority messages 109 and priority messages 209), in accordance with some embodiments of the present disclosure. In the method in flowchart 500, on receiving priority information from a storage device driver (e.g., storage device driver 204) of a host device (e.g., host device 203), the control circuitry (e.g., control circuitry 106) of a storage device (e.g., storage device 102, storage device 202) transfers (e.g., transfer 316) a high priority file (e.g., file 420) from slower access memory (e.g., main memory 404, similar to main memory 126) to faster access memory (e.g., cache memory 403, similar to cache memory 128) of a storage device (e.g., storage device 102, storage device 202, etc.) when the application (e.g., first application 210, second application 210, third application 210, etc.) requesting the file is idle (e.g., not sending requests to the storage device 102 or 202).

At step 501, the method for managing data caching based on priority information starts.

At step 502, control circuitry (e.g., control circuitry 106), using instructions stored in the firmware (e.g., firmware 118) on a storage device (e.g., storage device 202, storage device 102, etc.) determines if it has received priority information identifying high priority data from a host device (e.g., from the storage device driver 204 on a OS of a host device 203), where the high priority data was identified by the host device based on at least one of user hints (e.g., hints from the storage device driver 204 based on user inputs) or a heuristic analysis of memory access requests by an application executing on the host device stored on the storage device. In some embodiments, the heuristic analysis may include looking for certain file sizes, looking for certain file names, looking for certain locations in folders, using an AI model (e.g., a discriminator model) that could be trained to identify AI files based on past request patterns, etc. For example, the AI model could use words like "weights," "models," "LLM" etc., combined with a large file size requirement (e.g., over 50 GB). On determining (e.g., by firmware) that priority information has been received, the method continues to step 503. Based on determining (e.g., by firmware) that priority information has not been received, the control circuitry of the storage device returns of the beginning of the method at step 501.

At step 503, the control circuitry (e.g., control circuitry 106) in the storage device (e.g., storage device 202, storage device 102, etc.) monitors the host device to find an idle period (e.g., period when the storage device driver is not sending requests to the storage device).

At step 504, the control circuitry (e.g., control circuitry 106) in the storage device (e.g., storage device 202, storage device 102, etc.) determines whether an idle period has occurred. If it has occurred, the method continues to step 505. Else, the method returns to step 503 (e.g., monitoring for idle period). For example, if an application does not sent a request for 5 seconds, the storage device is kept active for 10 more seconds to transfer the files/data.

At step 505, the control circuitry (e.g., control circuitry 106) in the storage device (e.g., storage device 202, storage device 102, etc.) transfers, during the idle period, at least a portion of the identified high priority data from a first memory (e.g., slower access main memory 126), to a faster memory (e.g., faster access cache memory 128) on the storage device.

Figure 6:
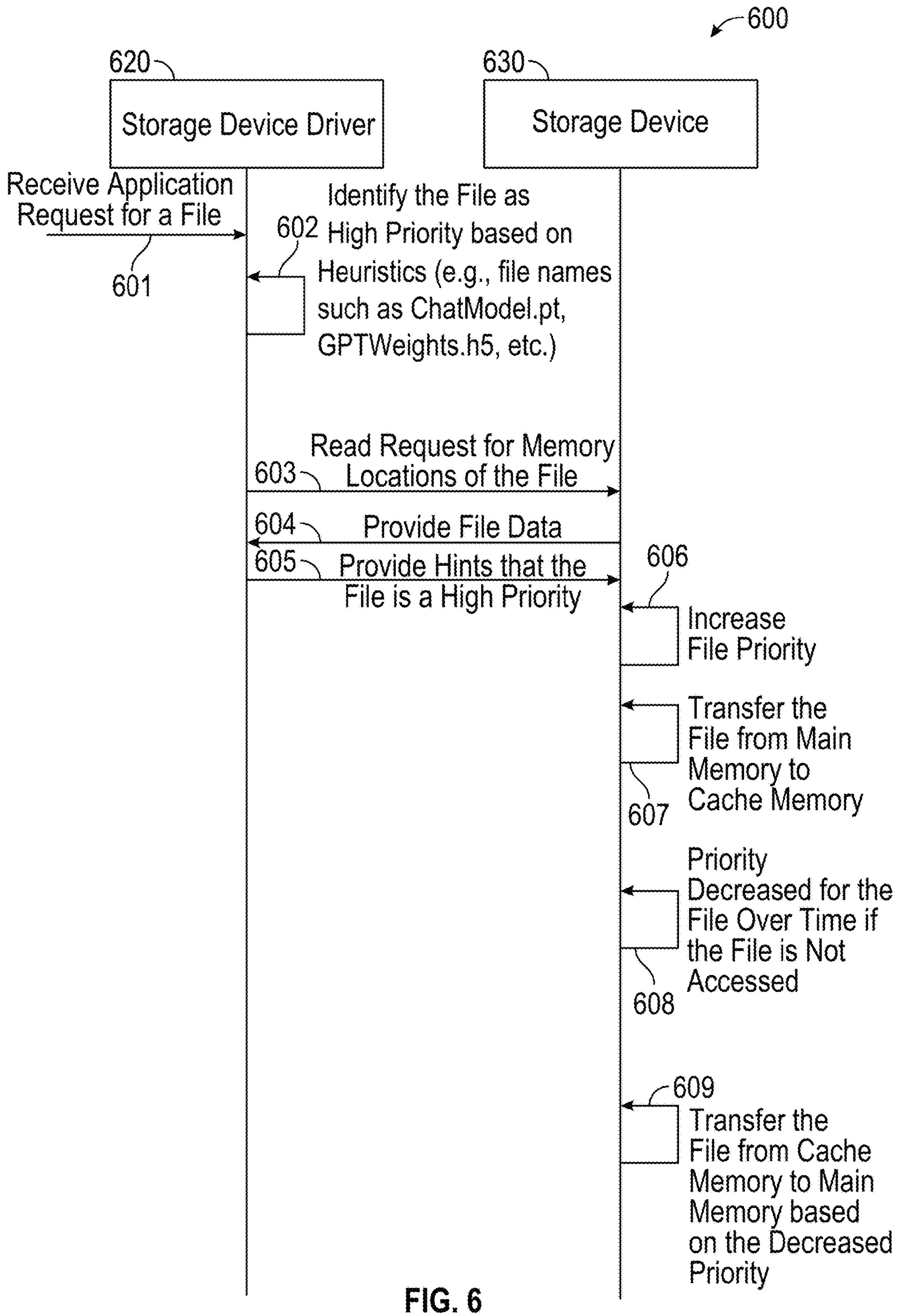
FIG. 6 shows an illustrative flowchart of a method for managing data caching based on heuristically identified priority information, in accordance with some embodiments of the present disclosure.

FIG. 6 shows an illustrative flowchart 600 of a method for managing data caching based on heuristically identified priority information, in accordance with some embodiments of the present disclosure. In the method in flowchart 600, on receiving priority information based on heuristic analysis (e.g., looking for certain file sizes, looking for certain file names, looking for certain locations in folders, using an AI model (e.g., a discriminator model) that could be trained to identify AI files based on past request patterns, etc.) from a storage device driver (e.g., storage device driver 204) of a host device (e.g., host device 203), the control circuitry (e.g., control circuitry 106) of a storage device (e.g., storage device 102, storage device 202) transfers (e.g., transfer 316) a high priority file from slower access memory (e.g., main memory 404, similar to main memory 126) to faster access memory (e.g., cache memory 403, similar to cache memory 128) of a storage device (e.g., storage device 102, storage device 202, etc.) when the application (e.g., first application 210, second application 210, third application 210, etc.) requesting the file is idle (e.g., not sending requests to the storage device 102 or 202). In some embodiments, if the file is not accessed over a certain period (e.g., predetermined period) of time, the high priority file may lose priority, and on not meeting a minimum criteria to be high priority, the file may be transferred back from the cache memory to the main memory.

At step 601, a storage device driver 620 (e.g., storage device driver 204) receives a request (e.g., request 220, and/or a request similar to request 220) from an application (e.g., first application 210, second application 210, third application 210, etc.) to access a file (e.g., file 420) from a storage device 630 (e.g., storage device 102, storage device 202).

At step 602, the storage device driver 620 identifies the requested file as high priority based on heuristic analysis as described above in the description for FIG. 6.

At step 603, the storage device driver 620 sends memory access requests (e.g., memory access requests 208) for the file to the firmware (e.g., firmware 118) storage device 630 based on the request from the application.

At step 604, the storage device 630 (e.g., control circuitry in the storage device) sends the requested file data (e.g., sends stored data 211) to the storage device 630.

At step 605, the storage device driver 620 sends priority hints (e.g., priority messages 109, priority messages 209) based on heuristic analysis to the storage device 630 for the requested file.

At step 606, the control circuitry of the storage device 630 increases priority for the file on receiving the priority hints from the storage device driver 620, and the file may become a high priority file.

At step 607, the control circuitry of the storage device 630 transfers the high priority file from a slower access main memory to a faster access cache memory. The cache memory may include several layers (e.g., fast, faster, fastest) of memory cells (e.g., TLC, MLC, SLC).

At step 608, the control circuitry of the storage device 630 decreases the priority of the high priority file if the file is not accessed over a certain period of time. The control circuitry in the storage device may reduce priority to the high priority file periodically (or on certain time periods) over time.

At step 609, if the priority of the file reaches below a certain minimum criteria to be a high priority file, the control circuitry of storage device 630 transfers the high priority file from the faster access cache memory back to the slower access main memory.

Figure 7:
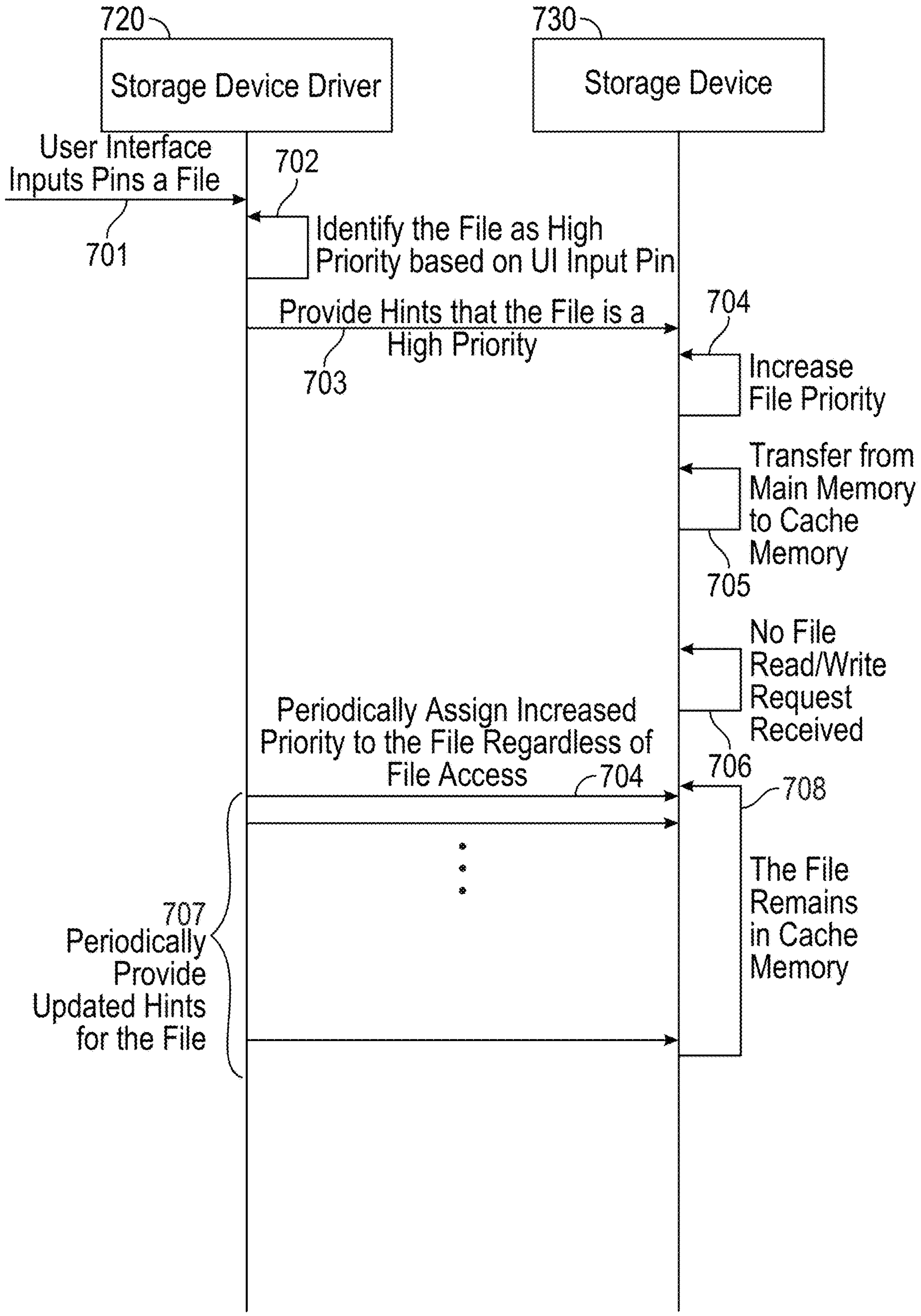
FIG. 7 shows an illustrative flowchart of a method for managing data caching based on user-identified priority information, in accordance with some embodiments of the present disclosure.

FIG. 7 shows an illustrative flowchart 700 of a method for managing data caching based on user identified priority information, in accordance with some embodiments of the present disclosure. In the method in flowchart 700, on receiving priority information based on user input (e.g., user input using a graphical user interface (GUI)) from a storage device driver (e.g., storage device driver 204) of a host device (e.g., host device 203), the control circuitry (e.g., control circuitry 106) of a storage device (e.g., storage device 102, storage device 202) transfers (e.g., transfer 316) a high priority file from slower access memory (e.g., main memory 404, similar to main memory 126) to faster access memory (e.g., cache memory 403, similar to cache memory 128) of the storage device (e.g., storage device 102, storage device 202, etc.) when the application (e.g., first application 210, second application 210, third application 210, etc.) requesting the file is idle (e.g., not sending requests to the storage device 102 or 202). In some embodiments, even if the file is not accessed over a certain period (e.g., predetermined period) of time, the high priority file will not lose priority as long as the user input is still valid, and the file will remain in the cache memory of the storage device.

At step 701, a storage device driver 720 (e.g., storage device driver on an OS of a host device) receives a user (e.g., application) input (e.g., using an interface) pinning (e.g., identifying as high priority) a file in a communicatively coupled (e.g., communicatively coupled to the storage device driver) storage device 730.

At step 702, the storage device driver 720 identifies the pinned file as high priority based on the user input in step 701. For example, when a user pins a file using a graphical user interface (GUI), storage device driver identifies the file as high priority till the user unpins the file using the GUI.

At step 703, the storage device driver 720 sends priority hints (e.g., priority information based on user pinning in step 701) to the firmware (e.g., firmware 118) in the storage device 730 for the pinned file.

At step 704, the control circuitry of the storage device 730 increases priority for the pinned file on receiving the priority hints from the storage device driver 720, and the file may become a high priority file.

At step 705, the control circuitry of storage device 730 transfers the pinned high priority file from a slower access main memory to a faster access cache memory. The cache memory may include several layers (e.g., fast, faster, fastest) of memory cells (e.g., TLC, MLC, SLC).

At step 706, the firmware in the storage device 730 receives no access requests (e.g., read/write request) from the storage device driver 720 for the pinned file over a period of time.

At step 707, the storage device driver 720 periodically sends priority hints to the firmware in the storage device 730 for the pinned file even when no access requests for the file are made, as long as the file remains pinned by the user.

At step 708, the pinned file remains in the cache memory of the storage device 730, as long as the file remains pinned by the user.

The term “storage device” means “drive” unless expressly specified otherwise.

Thus, methods and systems for memory belt architecture management have been provided among embodiments of the subject matter disclosed herein.

The terms “an embodiment”, “embodiment”, “embodiments”, “the embodiment”, “the embodiments”, “one or more embodiments”, “some embodiments”, and “one embodiment” mean “one or more (but not all) embodiments” unless expressly specified otherwise.

The terms “including”, “comprising”, “having” and variations thereof mean “including but not limited to”, unless expressly specified otherwise.

The enumerated listing of items does not imply that any or all of the items are mutually exclusive, unless expressly specified otherwise.

The terms “a”, “an” and “the” mean “one or more”, unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods, and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments need not include the device itself.

At least certain operations that may have been illustrated in the figures show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A method for operating a storage device coupled to a host device, wherein the storage device comprises a first memory with first performance characteristics and a second memory with second performance characteristics, the method comprising:

receiving, by the storage device from the host device, priority information identifying high priority data stored on the storage device, wherein:

the high priority data was identified by the host device based on user interface identification of the high priority data stored on the storage device;

periodically assigning increased priority to the high priority data based on a plurality of periodic messages from a driver of the storage device executing on the host device, wherein:

an application that sends access requests for the high priority data has become idle, and the periodically assigning increased priority to the high priority data maintains increased priority of the high priority data when the high priority data has not been accessed over a period of time for which the application has been idle;

identifying an idle period in which no requests from the host device are received by the storage device;

and transferring, during the idle period, at least a portion of the high priority data from the first memory to the second memory.

2. The method of claim 1, wherein the high priority data was identified by the host device by:

identifying, by a storage device driver executing on the host device, one or more files stored on the storage device with a size that exceeds a particular file size.

3. The method of claim 1, wherein the high priority data was identified by the host device by:

identifying, by a storage device driver executing on the host device, an artificial intelligence (AI) model file stored by the storage device by applying a heuristic model to the plurality of requests to access the storage device generated by the least one application executing on the host device.

4. The method of claim 1, wherein the first memory comprises a main memory that comprises a plurality quad-level cells (QLCs).

5. The method of claim 1, wherein the second memory comprises a cache memory that comprises a plurality of single-level cells (SLCs).

6. The method of claim 1, wherein the second memory comprises a cache memory that comprises a plurality of QLCs configured to operate as SLCs.

7. The method of claim 1, wherein the second performance characteristics comprises faster memory access operational speed than the first performance characteristics.

8. The method of claim 1, wherein the high priority data was identified by the host device based on the plurality of requests to access the storage device generated by the at least one application executing on the host device, the method further comprising:

increasing, based on a message from a driver of the storage device executing on the host device, priority of the high priority data;

determining that the high priority data has not been accessed over a period of time, and based, at least in part, on the determining that the high priority data has not been accessed over the period of time, decreasing priority of the high priority data.

9. The method of claim 8 further comprising:

based, at least in part, on the decreasing priority of the high priority data, transferring the high priority data from the second memory to the first memory.

10. A storage device comprising:

a first memory with first performance characteristics;

a second memory with second performance characteristics;

control circuitry configured to:

receive, from a host device, priority information identifying high priority data stored on the storage device, wherein:

the high priority data was identified by the host device based user interface identification of the high priority data stored on the storage device;

periodically assign increased priority to the high priority data based on a plurality of periodic messages from a driver of the storage device executing on the host device, wherein:

an application that sends access requests for the high priority data has become idle, and the periodically assigning increased priority to the high priority data maintains increased priority of the high priority data when the high priority data has not been accessed over a period of time for which the application has been idle;

identify an idle period in which no requests from the host device are received by the storage device; and transfer, during the idle period, at least a portion of the high priority data from the first memory to the second memory.

11. The storage device of claim 10, wherein the high priority data was identified by the host device by:

identifying, by a storage device driver executing on the host device, one or more files stored on the storage device with a size that exceeds a particular file size.

12. The storage device of claim 10, wherein the high priority data was identified by the host device by:

identifying, by a storage device driver executing on the host device, an artificial intelligence (AI) model file stored by the storage device by applying a heuristic model to the plurality of requests to access the storage device generated by the least one application executing on the host device.

13. The storage device of claim 10, wherein the first memory comprises a main memory that comprises a plurality quad-level cells (QLCs).

14. The storage device of claim 10, wherein the second memory comprises a cache memory that comprises a plurality of single-level cells (SLCs).

15. The storage device of claim 10, wherein the second memory comprises a cache memory that comprises a plurality of QLCs configured to operate as SLCs.

16. The storage device of claim 10, wherein the second performance characteristics comprises faster memory access operational speed than the first performance characteristics.

17. The storage device of claim 10, wherein the high priority data was identified by the host device based on the plurality of requests to access the storage device generated by the at least one application executing on the host device, wherein the control circuitry is further configured to:

increase, based on a message from a driver of the storage device executing on the host device, priority of the high priority data, determine that the high priority data has not been accessed over a period of time, and based, at least in part, on the determining that the high priority data has not been accessed over the period of time, decreasing priority of the high priority data.

18. The storage device of claim 17, wherein the control circuitry is further configured to:

based, at least in part, on the decreasing priority of the high priority data, transfer the high priority data from the second memory to the first memory.

* * * * *